United States Patent [19]
Rechnagel et al.

[11] Patent Number: 6,155,785
[45] Date of Patent: Dec. 5, 2000

[54] SUPPORT SPOKE FOR A WINDMILL

[76] Inventors: Larry Rechnagel; Lindell Jensen, both of 28043 SD Highway 19, Hurley, S. Dak. 57036

[21] Appl. No.: 09/292,572

[22] Filed: Apr. 15, 1999

[51] Int. Cl.[7] .................................................... F03D 11/00
[52] U.S. Cl. .................................. 416/196 A; 416/244 R
[58] Field of Search ............................ 416/196 A, 132 B, 416/197 A, 244 R, DIG. 4, DIG. 6; 415/908

[56] References Cited

U.S. PATENT DOCUMENTS

| | | |
|---|---|---|
| 244,971 | 8/1881 | Adams . |
| 515,408 | 2/1894 | Putnam . |
| 523,842 | 7/1894 | Noyes . |
| 766,662 | 8/1904 | Brett . |
| 997,819 | 7/1911 | Holmes . |
| 2,103,910 | 12/1937 | Lung . |
| 4,204,796 | 5/1980 | Pack, Jr. . |
| 4,303,375 | 12/1981 | Foglesong et al. . |
| 4,330,714 | 5/1982 | Smith . |
| 4,444,543 | 4/1984 | Wilks et al. ......................... 416/170 R |

*Primary Examiner*—Edward K. Look
*Assistant Examiner*—Ninh Nguyen

[57] ABSTRACT

A support spoke for a windmill for supporting blade rings of a windmill. The support spoke for a windmill includes an elongate rod with opposite first and second ends and a longitudinal axis extending between the ends. The first end is coupled to an outer ring of a fan portion of a windmill. The second end is adapted for threadable coupling to a hub of the fan portion of the windmill. An arm is rotatably coupled to the rod and is adapted for coupling to an inner ring of the fan portion of the windmill. A holding portion selectively prevents rotation of the arm about the rod to prevent loosening of the rod.

7 Claims, 2 Drawing Sheets

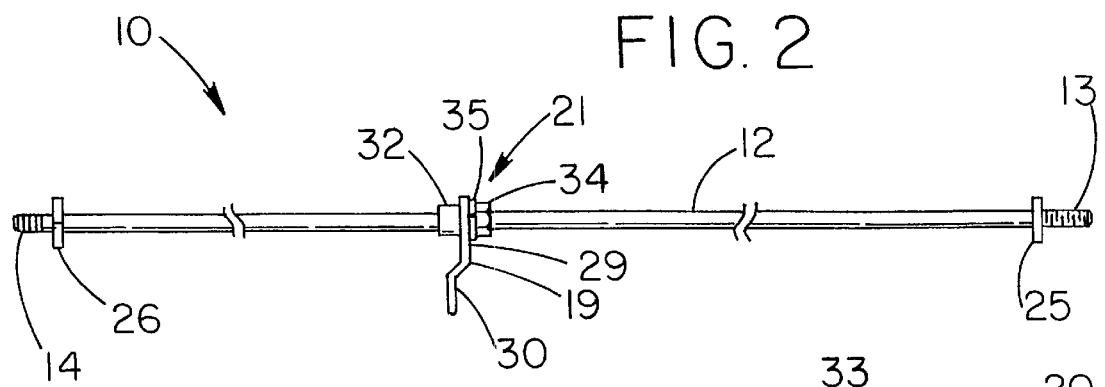
FIG. 2
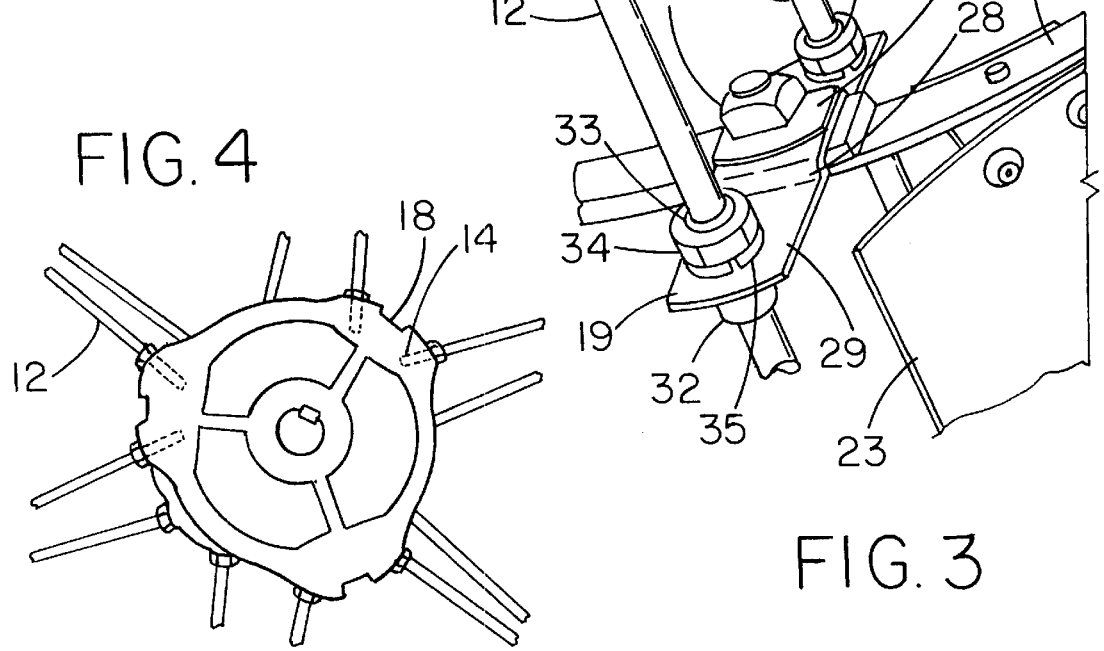
FIG. 4
FIG. 3
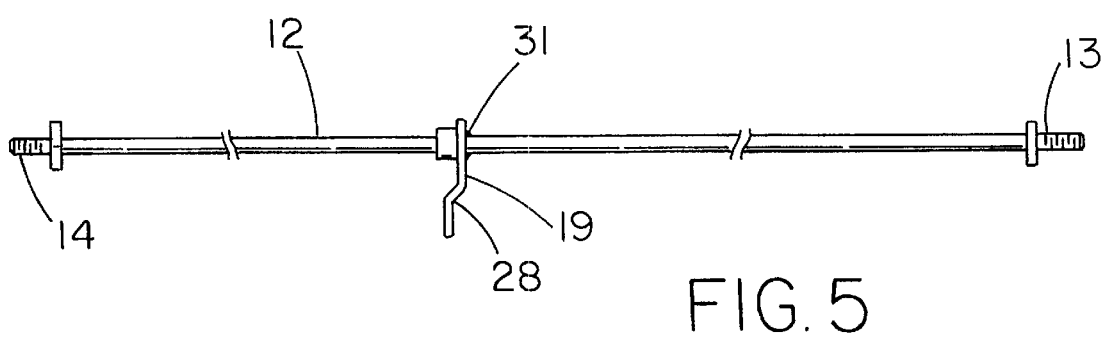
FIG. 5

SUPPORT SPOKE FOR A WINDMILL

BACKGROUND OF THE INVENTION

1. Field of the Invention

The present invention relates to windmill spokes and more particularly pertains to a new support spoke for a windmill for supporting blade rings of a windmill.

2. Description of the Prior Art

The use of windmill spokes is known in the prior art. More specifically, windmill spokes heretofore devised and utilized are known to consist basically of familiar, expected and obvious structural configurations, notwithstanding the myriad of designs encompassed by the crowded prior art which have been developed for the fulfillment of countless objectives and requirements.

In particular, windmill spokes known in the art have threaded ends and fixed arms that attach to an inner ring of the windmill. However, the spokes are not timed to the various parts of the windmill. As a result, the arms that couple a pair of spokes together at their center do not align when the spokes are fully threaded into the various parts of the windmill. Therefore, when installing the spokes, the spokes have to be rotated to align the arms. However, this loosens the spokes from the other parts of the windmill, and after a short period of use, vibrations cause wear on and finally tear the threads out of the parts of the windmill to which the spokes are attached.

Solutions to the above problem have been long sought. One method was to twist the center of the spoke with respect to its ends. However, this weakened the spoke. Another method was to place lead washers between outer flanges of the spokes and the parts of the windmill to which the spokes are attached and then align the arms. However, the lead washers eventually were squeezed out by the vibrations.

Known prior art includes U.S. Pat. No. 4,303,375; U.S. Pat. No. 523,842; U.S. Pat. No. 4,330,714; U.S. Pat. No. 4,204,796; U.S. Pat. No. 515,408; and U.S. Pat. No. 2,103,910; U.S. Pat. No. 244,971; U.S. Pat. No. 766,662; and U.S. Pat. No. 997,819.

While these devices fulfill their respective, particular objectives and requirements, the aforementioned patents do not disclose a new support spoke for a windmill. The inventive device includes an elongate rod with opposite first and second ends and a longitudinal axis extending between the ends. The first end is coupled to an outer ring of a fan portion of a windmill. The second end is adapted for threadable coupling to a hub of the fan portion of the windmill. An arm is rotatably coupled to the rod and is adapted for coupling to an inner ring of the fan portion of the windmill. A holding portion selectively prevents rotation of the arm about the rod to prevent loosening of the rod.

In these respects, the support spoke for a windmill according to the present invention substantially departs from the conventional concepts and designs of the prior art, and in so doing provides an apparatus primarily developed for the purpose of supporting blade rings of a windmill.

SUMMARY OF THE INVENTION

In view of the foregoing disadvantages inherent in the known types of windmill spokes now present in the prior art, the present invention provides a new support spoke for a windmill construction wherein the same can be utilized for supporting blade rings of a windmill.

The general purpose of the present invention, which will be described subsequently in greater detail, is to provide a new support spoke for a windmill apparatus and method which has many of the advantages of the windmill spokes mentioned heretofore and many novel features that result in a new support spoke for a windmill which is not anticipated, rendered obvious, suggested, or even implied by any of the prior art windmill spokes, either alone or in any combination thereof.

To attain this, the present invention generally comprises an elongate rod with opposite first and second ends and a longitudinal axis extending between the ends. The first end is coupled to an outer ring of a fan portion of a windmill. The second end is adapted for threadable coupling to a hub of the fan portion of the windmill. An arm is rotatably coupled to the rod and is adapted for coupling to an inner ring of the fan portion of the windmill. A holding portion selectively prevents rotation of the arm about the rod to prevent loosening of the rod.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new support spoke for a windmill apparatus and method which has many of the advantages of the windmill spokes mentioned heretofore and many novel features that result in a new support spoke for a windmill which is not anticipated, rendered obvious, suggested, or even implied by any of the prior art windmill spokes, either alone or in any combination thereof.

It is another object of the present invention to provide a new support spoke for a windmill which may be easily and efficiently manufactured and marketed.

It is a further object of the present invention to provide a new support spoke for a windmill which is of a durable and reliable construction.

An even further object of the present invention is to provide a new support spoke for a windmill which is susceptible of a low cost of manufacture with regard to both materials and labor, and which accordingly is then susceptible of low prices of sale to the consuming public, thereby making such support spoke for a windmill economically available to the buying public.

Still yet another object of the present invention is to provide a new support spoke for a windmill which provides in the apparatuses and methods of the prior art some of the advantages thereof, while simultaneously overcoming some of the disadvantages normally associated therewith.

Still another object of the present invention is to provide a new support spoke for a windmill for supporting blade rings of a windmill.

Yet another object of the present invention is to provide a new support spoke for a windmill which includes an elongate rod with opposite first and second ends and a longitudinal axis extending between the ends. The first end is coupled to an outer ring of a fan portion of a windmill. The second end is adapted for threadable coupling to a hub of the fan portion of the windmill. An arm is rotatably coupled to the rod and is adapted for coupling to an inner ring of the fan portion of the windmill. A holding portion selectively prevents rotation of the arm about the rod to prevent loosening of the rod.

Still yet another object of the present invention is to provide a new support spoke for a windmill that eliminates all twisting of spokes or using shim washers to get the spoke clip to stop in the proper spot and still have the spoke completely tighten into the hub.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic side view of the present invention.

FIG. 3 is a schematic perspective view of the present invention taken from circle 3 of FIG. 1.

FIG. 4 is a schematic cross sectional view of the hub of the present invention.

FIG. 5 is a schematic side view of the present invention.

DESCRIPTION OF THE PREFERRED EMBODIMENT

Figure 1:
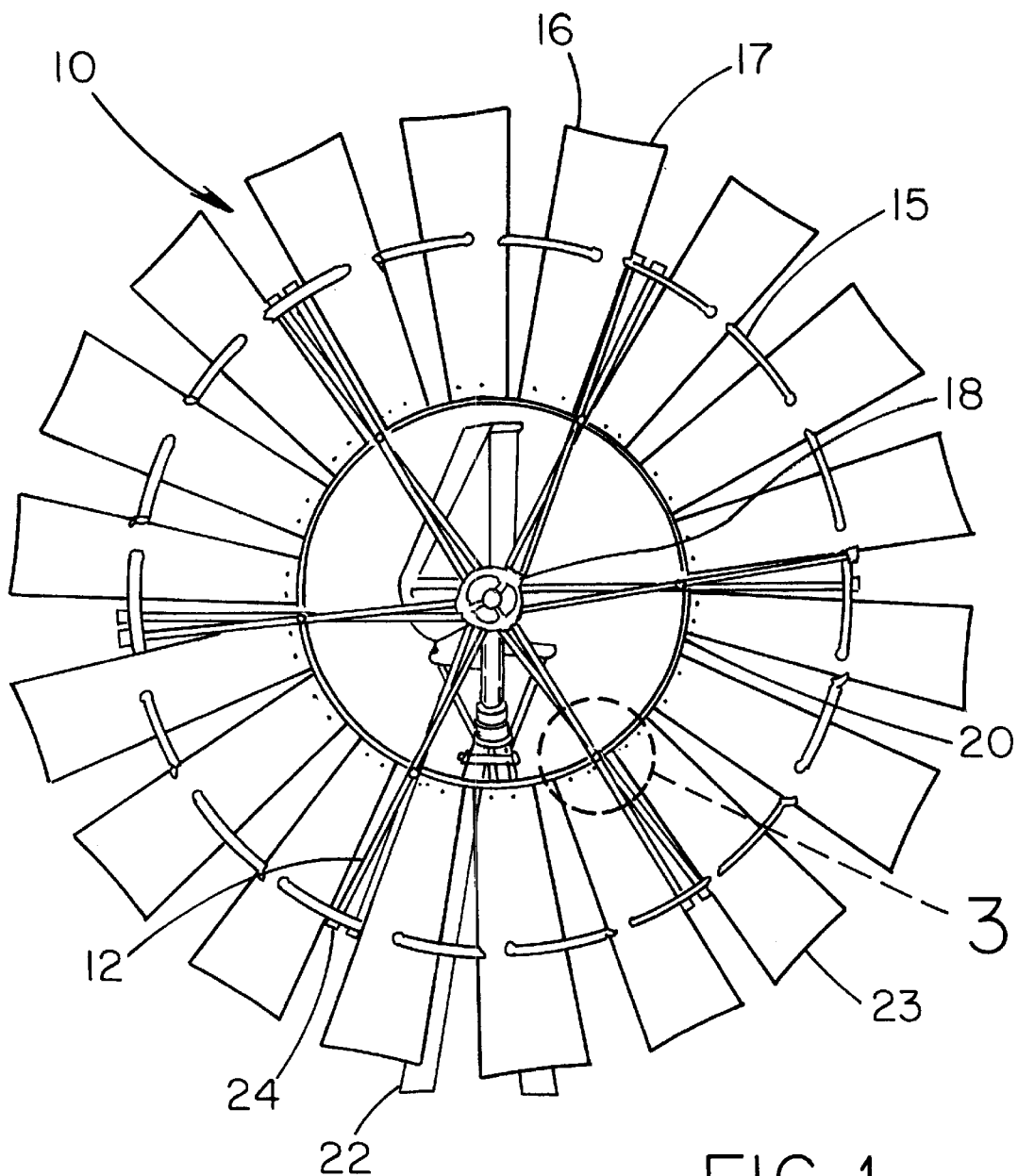
FIG. 1 is a schematic front view of a new support spoke for a windmill according to the present invention.

With reference now to the drawings, and in particular to FIGS. 1 through 5 thereof, a new support spoke for a windmill embodying the principles and concepts of the present invention and generally designated by the reference numeral 10 will be described.

As best illustrated in FIGS. 1 through 5, the support spoke for a windmill 10 generally comprises an elongate rod 12 with opposite first and second ends 13,14 and a longitudinal axis extending between the ends. The first end is coupled to an outer ring 15 of a fan portion 16 of a windmill 17. The second end is adapted for threadable coupling to a hub 18 of the fan portion of the windmill. An arm 19 is rotatably coupled to the rod and is adapted for coupling to an inner ring 20 of the fan portion of the windmill. A holding means 21 selectively prevents rotation of the arm about the rod to permit proper timing of the threads of the spoke and prevent loosening of the rod.

The support spoke is designed for use with a windmill that has a support structure 22. The fan portion of the windmill has a hub rotatably coupled to the support structure, an outer ring spaced apart from the hub, an inner ring positioned between the outer ring and the hub, and a plurality of curved blades 23 coupled to the rings. The inner and outer rings each comprise a plurality of arcuate sections coupled together. A plurality of support spokes extend radially from the hub to support the inner and outer rings.

Preferably, the first and second ends of the rod are threaded. A longitudinal axis is defined between the ends. The first end is coupled to the outer ring of the fan portion of the windmill by extending through holes in the outer ring and fastened to it by a nut 24, while the second end is threadably coupled to threaded bores in the hub. The rods should be at least twenty four inches long.

Most preferably, a first peripheral flange 25 is positioned towards the first end for added support to the outer ring, which is then pinched between the nut and the first peripheral flange. Also most preferably, a second peripheral flange 26 is positioned towards the second end of the rod. The second peripheral flange has a polygonal outer surface so that a wrench may be used to tighten the second end into the hub.

The arm is rotatably coupled to the rod and is adapted for coupling to the inner ring of the fan portion. Preferably, the arm has an aperture through it positioned towards its outer end through which a fastener 27 is inserted to fasten a pair of arms to overlapping ends of the sections of the inner ring. See FIG. 3.

Preferably, the arm has a bend 28 dividing the arm into inner and outer portions 29,30 lying on spaced apart generally parallel planes. The bend engages the inner ring and prevents pivoting of the arm around the fastener that couples the arm to the inner ring, which could cause loosening of the threaded ends of the rod from the hub and from the nut coupling the rod to the outer ring.

The holding means selectively prevents rotation of the arm about the rod by fixing the arm to the rod. Any suitable holding means may be used, including spot welding 31, adhesives, friction devices, tongue and groove assemblies, pins, clamps, and the like.

The preferred holding means includes a first sleeve 32 fixedly coupled to the rod and positioned between the arm and the second end of the rod. A threaded sleeve 33 is fixedly coupled to the rod and positioned adjacent the first sleeve. The arm is positionable over the threaded sleeve. A threaded fastener 34 Such as a nut threadably engages the threaded sleeve for pinching the arm between the threaded fastener and the first sleeve to frictionally prevent the arm from rotating about the rod. Ideally, a lock washer 35 is positioned between the threaded fastener and the arm to help prevent loosening of the threaded fastener.

The arm could also be nonrotatably fastened to the rod by spot welding 31, in which case the rod would be fastened to the hub and outer ring, then the arm fastened to the inner ring before welding.

In use, the second end of the rod of the support spoke is inserted in a threaded bore of the hub and rotated until tight. Preferably, a wrench is used. The wrench nonrotatbly engages the polygonal outer surface of the second peripheral flange of the rod. The first end of the rod is attached to the outer ring. The arm is pivoted towards the inner ring and attached to the inner ring. The holding means is engaged to prevent pivoting of the arm with respect to the rod. Then the blades are attached to the rings.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A spoke for a windmill, comprising:
   an elongate rod having opposite first and second ends and a longitudinal axis extending between said ends, said first end being coupled to an outer ring of a fan portion of a windmill, said second end being adapted for threadable coupling to a hub of said fan portion of said windmill;
   an arm rotatably coupled to said rod and adapted for coupling to an inner ring of said fan portion of said windmill;
   a holding means for selectively preventing rotation of said arm about said rod; and
   wherein said holding means comprises a first sleeve fixedly coupled to said rod and positioned between said arm and said second end of said rod, a threaded sleeve fixedly coupled to said rod and positioned adjacent said first sleeve, said arm being positionable over said threaded sleeve, and a threaded fastener threadably engaging said threaded sleeve for pinching said arm between said threaded fastener and said first sleeve.

2. The spoke of claim 1, wherein said arm has a bend dividing said arm into inner and outer portions lying on spaced apart generally parallel planes.

3. The spoke of claim 1, further comprising a lock washer being positioned between said threaded fastener and said arm.

4. The spoke of claim 1, wherein said holding means comprises a weld.

5. A windmill, comprising:
   a support structure; and
   a fan portion having a hub rotatably coupled to said support structure, an outer ring spaced apart from said hub, an inner ring positioned between said outer ring and said hub, a plurality of spokes extending between said hub and said outer ring, and a plurality of blades coupled to said rings;
   each of said spokes comprising:
      an elongate rod having opposite threaded first and second ends and a longitudinal axis extending between said ends, said first end being coupled to said outer ring of said fan portion, said second end being threadably coupled to said hub;
      a first peripheral flange positioned towards said first end;
      a second peripheral flange positioned towards said second end, said second peripheral flange having a polygonal outer surface;
      an arm rotatably coupled to said rod and adapted for coupling to said inner ring of said fan portion, said arm being oriented generally perpendicular to said longitudinal axis of said rod;
      said arm having a bend dividing said arm into inner and outer portions lying on spaced apart generally parallel planes;
      a holding means for selectively preventing rotation of said arm about said rod;
      a first sleeve fixedly coupled to said rod and positioned between said arm and said second end of said rod;
      a threaded sleeve fixedly coupled to said rod and positioned adjacent said first sleeve, said arm being positionable over said threaded sleeve;
      a threaded fastener threadably engaging said threaded sleeve for pinching said arm between said threaded fastener and said first sleeve; and
      a lock washer being positioned between said threaded fastener and said arm.

6. A method of assembling a windmill and timing an arm of a windmill spoke, comprising the steps of:
   providing a support structure;
   rotatably coupling a hub to said support structure;
   positioning an outer ring in a spaced apart relation from said hub;
   positioning an inner ring between said outer ring and said hub;
   providing a plurality of spokes, each of said spokes comprising:
      an elongate rod having opposite first and second ends and a longitudinal axis extending between said ends;
      an arm rotatably coupled to said rod and adapted for coupling to said inner ring of said fan portion; and
      a holding means for selectively preventing rotation of said arm about said rod;
      wherein said holding means comprises a first sleeve fixedly coupled to said rod and positioned between said arm and said second end of said rod, a threaded sleeve fixedly coupled to said rod and positioned adjacent said first sleeve, said arm being positionable over said threaded sleeve, and a threaded fastener threadably engaging said threaded sleeve for pinching said arm between said threaded fastener and said first sleeve;
   threadably coupling said second end of said rod to said hub until tight;
   attaching said first end of said rod to said outer ring;
   attaching said arm to said inner ring of said fan portion;
   engaging said holding means for preventing rotation of said arm about said rod; and
   attaching a plurality of blades to said rings.

7. The method of claim 6 wherein said holding means comprises a weld.

* * * * *